Dec. 11, 1923.
W. J. RHODES
1,477,004
AUXILIARY BRAKE SYSTEM
Filed Aug. 30, 1921
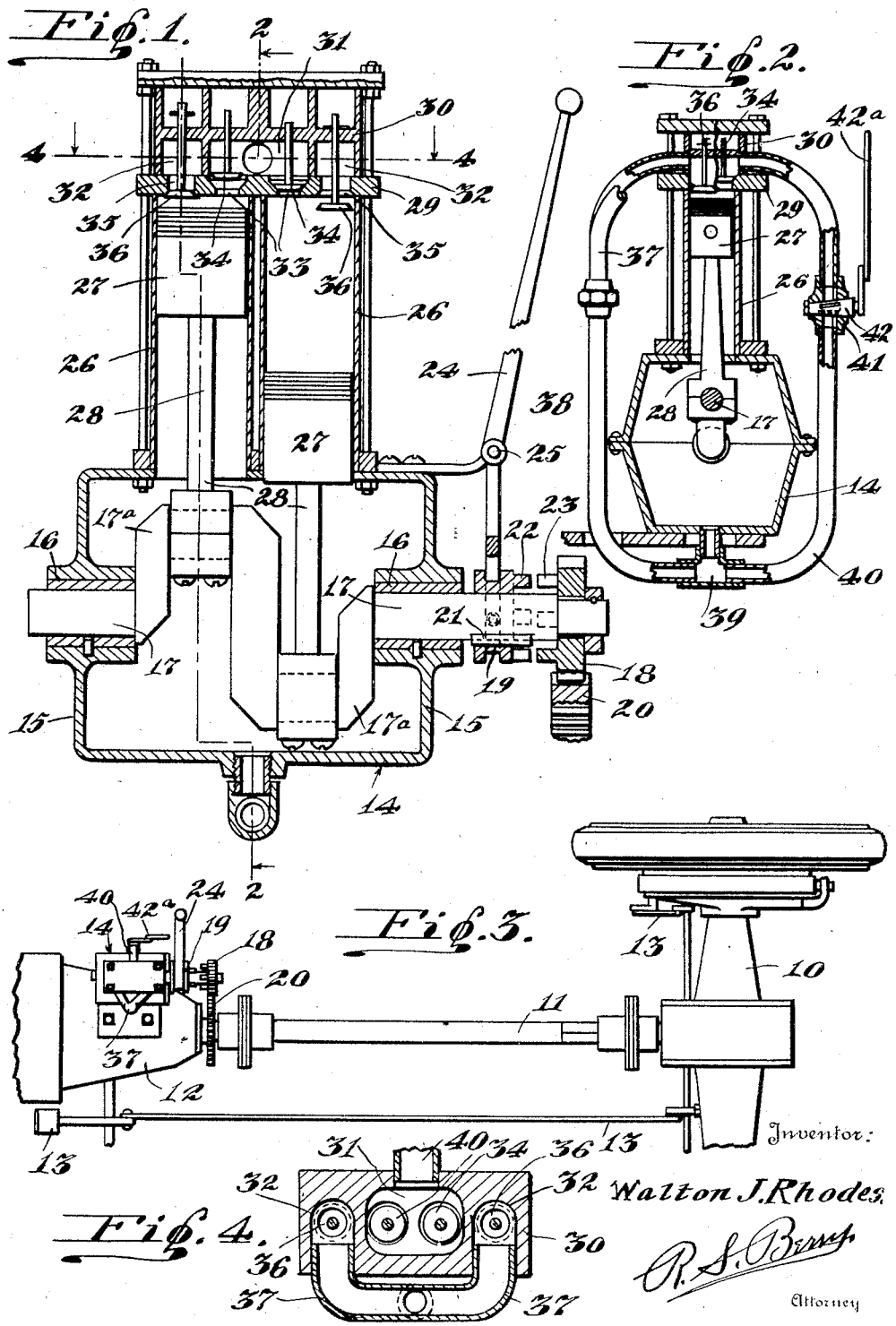
Inventor:
Walton J. Rhodes
Attorney Patented Dec. 11, 1923.

1,477,004

UNITED STATES PATENT OFFICE.

WALTON J. RHODES, OF LOS ANGELES, CALIFORNIA.

AUXILIARY-BRAKE SYSTEM.

Application filed August 30, 1921. Serial No. 496,807.

*To all whom it may concern:*

Be it known that I, WALTON J. RHODES, a citizen of the United States, residing at Los Angeles, in the county of Los Angeles and State of California, have invented new and useful Improvements in an Auxiliary-Brake System, of which the following is a specification.

My invention relates to an auxiliary brake system for motor vehicles, and has for its principal object the provision of a relatively simple, practical and highly efficient auxiliary brake that may be advantageously utilized in connection with the ordinary brakes for controlling the retardation and stoppage of the vehicle with which it is associated.

Further objects of my invention are to provide an auxiliary brake system that is very compact, capable of being easily and cheaply produced, applicable for use in connection with practically all forms of motor vehicles, and further to provide simple and efficient means for controlling the degree of braking power developed by the apparatus while in use.

With the foregoing and other objects in view my invention consists in certain novel features of construction and arrangement of parts that will be hereinafter more fully described and claimed, and illustrated in the accompanying drawings, in which:—

Figure 1 is a vertical section taken through the center of an auxiliary brake of my improved construction.

Figure 2 is a cross sectional view taken approximately on the line 2—2 of Figure 1.

Figure 3 is a plan view of a portion of the chassis of a motor vehicle including the driving shaft, and showing my auxiliary brake in position upon the transmission gear housing.

Figure 4 is a horizontal section taken on the line 4—4 of Figure 1.

Referring by numerals to the accompanying drawings which illustrate a practical embodiment of my invention, 10 designates the rear axle of a motor vehicle, 11 the motor driven shaft that is connected by the usual differential gearing to said rear axle, 12 the transmission gear housing and 13 the usual foot pedal operated brake and associated parts.

My auxiliary brake includes a housing 14, provided in its end walls 15 with bearings 16 for a crank shaft 17, and the latter being extended beyond one bearing in order to receive a pinion 18 and a clutch collar 19. Pinion 18 is loosely mounted on the crank shaft and meshes with a larger pinion 20 that is fixed on drive shaft 11. Collar 19 is mounted on a key or feather 21 that is seated in shaft 17, so that it rotates with, slides lengthwise upon said shaft and formed on the outer face of said collar is a clutch face 22 that is adapted to engage a clutch face 23 that is formed on pinion 18.

Collar 19 is engaged by the bifurcated lower end of a hand lever 24, that is fulcrumed at 25 to a bracket that projects outwardly from housing 14. Obviously handle 24 extends upwardly into the tonneau of the vehicle at a point adjacent to the driver's seat.

Fixed to and extending upwardly from the top of housing 14 is a pair of cylinders 26, in which are arranged for operation pistons 27 and connecting the latter in the usual manner to oppositely disposed cranks $17^a$ of shaft 17, are piston rods 28.

Secured on top of cylinders 26 is a head 29 and secured on top of the latter is a block 30 in which is formed a centrally arranged chamber 31 and a pair of end chambers 32. Valve openings 33 are formed in head 29 and establish communication between the chambers in the cylinders 26 and chamber 31 and normally closing said openings are outwardly opening check valves 34.

Formed through head 29 and establishing communication between the chambers within cylinders 26 and the end chambers 32 are valve openings 35, that are adapted to be closed by downwardly opening check valves 36. The stems of valves 34 and 36 have bearings in the upper portion of block 30.

Leading from the chambers 32 are tubes 37 that connect with a single tube 38 and the latter leads to a T-connection 39 that is seated in the bottom of housing 14.

Leading from chamber 31 to T-connection 39 is a tube 40 and located at a suitable point therein is a control valve 41, preferably of the type having a rotatably arranged conical plug 42 through which is formed a diametrically arranged aperture.

Valve 41 is provided with suitable operating means, preferably a crank arm that is engaged by an operating rod $42^a$. When the auxiliary brake is set up for use a suitable quantity of liquid, such as oil, glycerine or the like is placed in housing 15, and in order to set up a circulation of this liquid through the apparatus, lever 24 is actuated to shift collar 19 on the shaft 17 so as to engage clutch member 22 with clutch member 23. Pinion 20 carried by shaft 11, drives pinion 18 and through clutch collar 19 rotary motion is transmitted to crank shaft 17. Pistons 27 reciprocating in cylinders 26 alternately draw check valves 36 open thereby producing suction in chambers 32, tubes 37 and tube 38 with the result that liquid from the lower portion of housing 14 will be drawn through said tubes and chambers into the cylinders 26 above said pistons on the downward or suction strokes of the latter and on the upward or compression strokes of said pistons, the liquid will be forced past check valves 34 into chamber 31 and from thence through tube 40 and open valve 41 back to housing 14. It will thus be seen that the flow of the liquid will be continuous in one direction through the tubes 37—38 from the housing 15 to the cylinders and thence from the cylinders back to the housing through the tube 40, by reason of the control effected by the check valves. Obviously by regulating valve 41 the volume of liquid permitted to flow through pipe 40 may be very accurately controlled and as said valve is slowly closed the pumping action of the pistons on their outward or compression strokes will be correspondingly gradually resisted, and this back pressure or resistance will be transmitted to drive shaft through parts 28, 17, 19, 18 and 20 consequently retarding or braking the movement of said shaft and in turn retarding or braking the forward movement of the vehicle.

Thus it will be seen that I have produced a relatively simple, practical and positively acting auxiliary brake mechanism that may be advantageously used on motor vehicles for gradually diminishing the speed thereof or for controlling the speed of the vehicle while the same is "coasting" or travelling down grade, said mechanism being very compact, capable of accurate control and regulation, and being very effective in performing its intended functions.

Minor changes in the size, form and construction of the various parts of my improved auxiliary brake system may be made and substituted for those herein shown and described without departing from the spirit of my invention, the scope of which is set forth in the appended claims.

I claim as my invention:

1. The combination with a motor vehicle and its driving shaft, of a pump, means for driving said pump from said driving shaft, means for rendering said pump driving means inoperative, liquid circulation tubes associated with said pump, means whereby a continuous circulation of liquid through said tubes in one direction may be effected on operation of said pump, and means for controlling the circulation of liquid through said tubes.

2. The combination with a motor vehicle and its driving shaft, of means forming a substantially continuous chamber, a body of liquid contained within said chamber, means adapted to be driven by the vehicle driving shaft for effecting a circulation of the liquid through said chamber, means for controlling and cutting off the flow of liquid through said chamber, and means for rendering the circulation effecting means inoperative.

3. In an auxiliary brake for motor vehicles, a reciprocating pump provided with a crankcase, a body of liquid contained within said crankcase and pump, means fixed to said pump adapted to be driven by the vehicle driving shaft for effecting a circulation of the liquid through said pump and crankcase means for controlling and reducing the flow of said liquid through said pump, and means manually controlled for disconnecting said pump from driving shaft and to render the circulation effecting means inoperative.

4. The combination with a motor vehicle and its driving shaft, of a pump and crankcase, pipes connecting said pump and crankcase, a body of liquid contained within said pump, crankcase and pipes, means driven by said driving shaft for effecting a circulation of said liquid means fixed in one of said pipes for controlling and restricting the flow of liquid therethrough, and means for manually releasing said pump from said driving shaft so that circulation is discontinued.

5. In a vehicle brake system, the combination with a motor vehicle and its driving shaft of a counter crank shaft, means for throwing said counter crank shaft in and out of engagement with said driving shaft, a plurality of reciprocal pistons, means for operating said pistons from said counter crank shaft, a crankcase encompassing said crank shaft, a cylinder head in which said pistons are mounted, intake and exhaust valves in said cylinder head, a conduit leading to the crankcase and communicating with the cylinders above the pistons through the intake valves and a conduit leading from the crankcase and communicating with the space in the cylinders above the pistons through the exhaust valves.

WALTON J. RHODES.